United States Patent Office 2,819,649
Patented Jan. 14, 1958

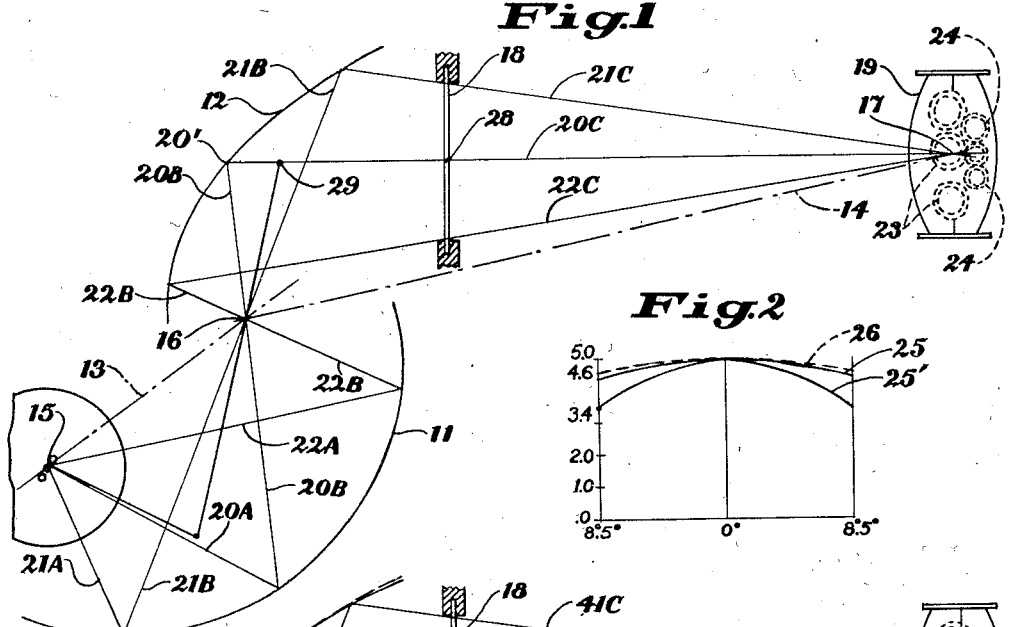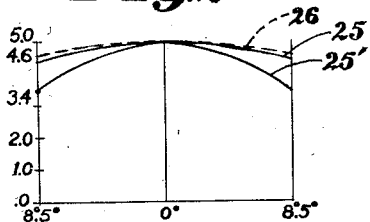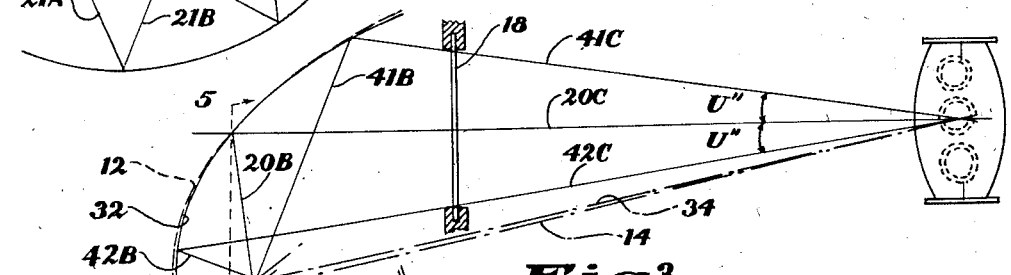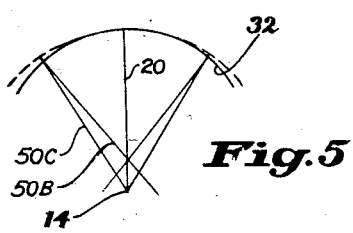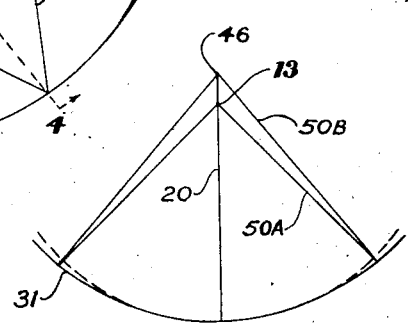
John H. McLeod
Paul W. Stevens
INVENTORS Jan. 14, 1958  J. H. McLEOD ET AL  2,819,649
REFLECTING CONDENSER SYSTEM FOR PROJECTORS
Filed Feb. 1, 1956  2 Sheets-Sheet 2
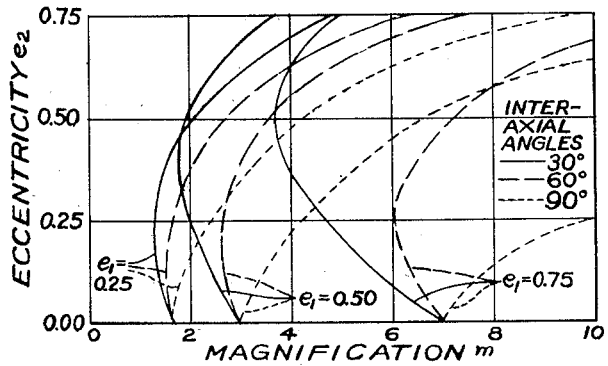
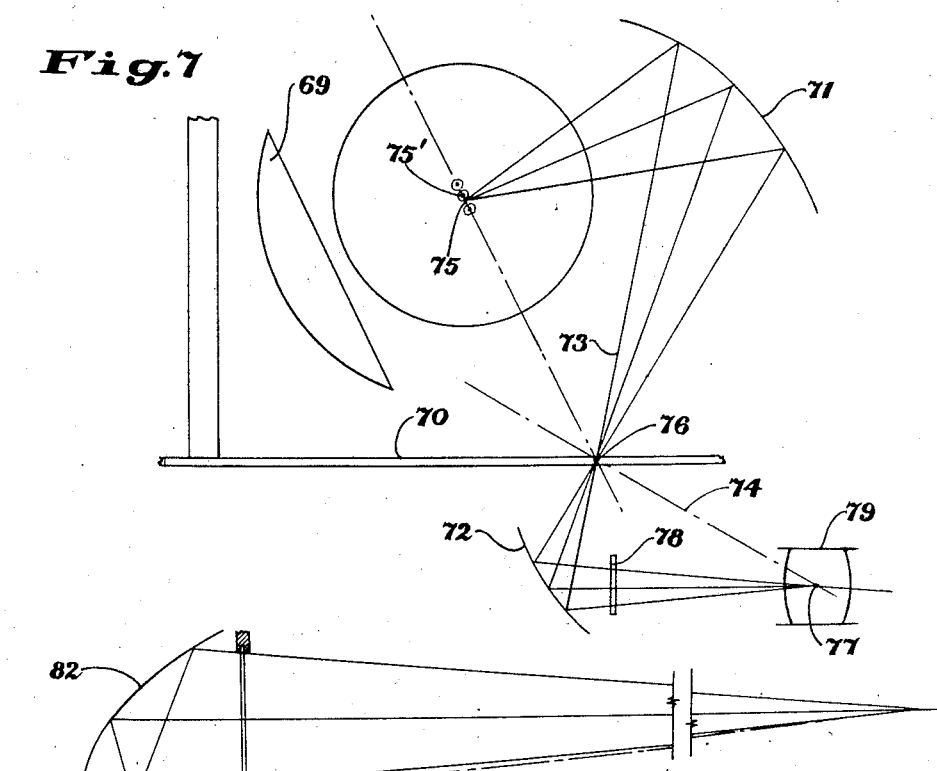
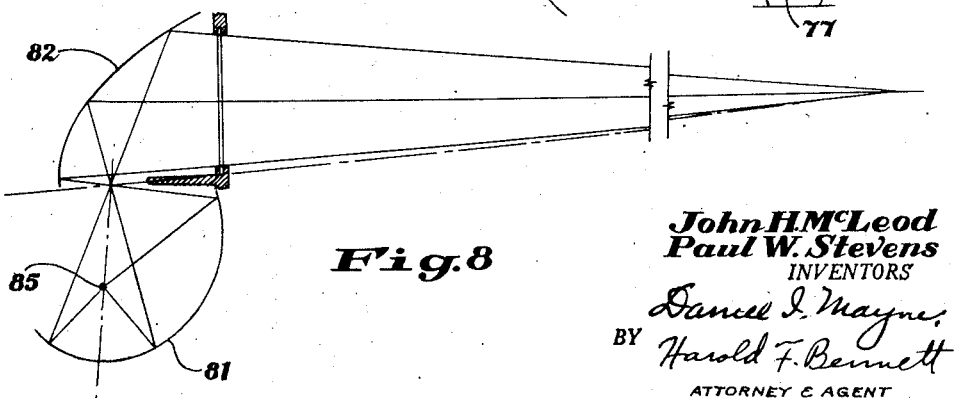
John H. M<sup>c</sup>Leod
Paul W. Stevens
INVENTORS
BY
ATTORNEY & AGENT

2,819,649

REFLECTING CONDENSER SYSTEM FOR PROJECTORS

John H. McLeod and Paul W. Stevens, Rochester, N. Y., assignors to Eastman Kodak Company, Rochester, N. Y., a corporation of New Jersey Application February 1, 1956, Serial No. 562,694

6 Claims. (Cl. 88—24)

This invention relates to condenser systems for motion-picture projectors, projection printers and slide projectors and may also be useful in searchlights for giving a very sharply focused beam. An important feature of the invention is the use of elliptical mirrors or of mirrors of slightly deformed elliptical shape.

An object of the invention is to provide a condenser system for projectors which is simple and inexpensive to produce in mass production.

Another object of the invention is to provide a condenser system by which a motion-picture gate can be efficiently illuminated from the inside of a sprocket wheel and under other conditions in which there is a limited amount of space behind the film gate.

An object of one form of the invention is to provide a condenser system by which the screen illumination is made uniform or optionally is made to depart from uniformity from center toward edge by a predetermined amount.

Ellipsoids have often been tried as condensers in projection systems but suffer from an enormous amount of coma in the image of the light source and so tend to produce nonuniform illumination on the screen. This disadvantage can be minimized when an arc light is the source and the source can be imaged substantially in the film gate, but elliptical mirrors are usually unsatisfactory for use with incandescent filament lamps because the patterns formed by the filament coil cause spotty illumination if focused in the gate, and the coma tends to produce nonuniform illumination if the filament image is focused in the projection lens. This enormous coma has been eliminated in illumination systems requiring unit magnification by arranging two ellipsoidal mirrors on opposite sides of a common axis and with the second focal point of the first coinciding with the first focal point of the second. A source or object area at the first focus of the first mirror is imaged at the common focal point with considerable coma and is then relayed by the second mirror with coma opposite to that of the first, so that a coma-free image is produced at the second focus of the second mirror. This arrangement has the advantage of giving a coma-free image but is limited to unit magnification, whereas a condenser for a projector or a projection printer usually must have a magnification greater than unity.

According to one form of the present invention, an illuminating system is made up comprising a light source and two ellipsoidal concave mirrors each having an axis of rotational symmetry, in which the first focal point of the second mirror coincides with the second focal point of the first mirror, in which the two axes intersect at an acute angle between 10° and 80°, in which the two mirrors are located in the obtuse angles supplementary thereto, in which the light source is located at the first focal point of the first mirror whereby the first mirror forms an image of the light source at the intersection point of the two axes, in which the second focal point of the second mirror lies on the axis of the second mirror in the direction more remote from the light source, and in which the second mirror has greater eccentricity and produces greater magnification than the first mirror and has coma of the opposite sign whereby the magnifications produced by two groups of rays near the opposite margins of the beam are equalized and whereby the final magnification is greater than unity.

We have discovered that two ellipsoidal mirrors arranged according to the invention illuminate the gate of a projector very efficiently and give a magnification in the usual range upwards of two times so as to fill the pupil of an ordinary projection lens.

While considerable latitude is allowable in the selection of the angle between axes and other parameters of the system, we have found it helpful to locate the optical axis of the system along a ray that we have named the "stable ray." This is defined according to a phenomenon which is analogous to the action of a single completely closed ellipsoidal shell and which will now be explained. In a single ellipsoid, any ray passing through one focus is reflected and passes through the other focus and if it continues through the latter point and is reflected again, it returns to the first focus and after repeated reflections it will be found to approach closer and closer to the major axis of the ellipse. By analogy, a ray will act similarly in the two ellipse system. That is, if the two complete ellipses are drawn, then any ray through the first focus of the first ellipse reflected once from the first ellipse then twice from the second ellipse then twice from the first ellipse, then twice from the second ellipse, and so on, will approach closer and closer to a limiting value which is the stable ray. If the projection lens system and the film gate are positioned so that the axis thereof coincides with the stable ray, then the illumination of the film gate will be found to be nearly symmetrical in all directions from the center.

It may be noted that any ellipsoidal mirror may be replaced by a larger or smaller mirror having the same eccentricity without changing the magnification of the system, and thus a system is adapted to be large enough to fill the required gate and yet no larger than necessary. The eccentricity is defined in the customary way as the ratio of the distance between foci to the length of the major axis. Thus it will be seen that the two eccentricities and the angle between the ellipse axes are sufficient as parameters to define the optical system, and that the magnification and the location of the optical axis are uniquely determined from these.

A condenser system was designed having a paraxial magnification of 5.0, and a sample was made up which was found to give a satisfactorily sharp image of the lamp filament, but it was also found that the magnification dropped off considerably for the zones of the mirror away from the axis to a value of 3.4 at the edges of the mirrors. Some unsymmetrical distortion was also found, such that the best position of the filament was found to be slightly unsymmetrical with respect to the focus of the ellipse.

According to a preferred form of the invention, the two elliptical mirrors are modified or deformed in such a way that the curvature of each mirror remains the same as that of the ellipse at the point where the optical axis is reflected but is decreased at the two ends of the first mirror and increased at the two ends of the second mirror. We have discovered that this deformation of the elliptical mirrors introduces spherical aberration of one sign in the first mirror and of the opposite sign in the second mirror and thereby modifies the coma in such a way as to improve the uniformity of magnification of the filament image for different zones of the mirror.

The magnification can be made equal for all zones of the mirror or it can be made to decrease or increase from the center toward the edge by a predetermined amount so as to produce a desired degree of screen uniformity. We prefer to compute the curves first for the rays lying in the plane common to the two axes and to make up mirrors of the form generated by rotating these curves around two lines defined below with reference to Fig. 3 and lying rather close to the major axes of the respective ellipses and then, in case the magnification in the transverse direction is not satisfactorily corrected, to change the axis of rotation or to figure each mirror by local polishing as necessary to improve the results. Once a master set of mirrors or a master mold is produced, then replicas are readily made by known methods.

The invention will be more fully understood in connection with the accompanying drawings in which:

Fig. 1 is a diagrammatic axial section of a two-mirror condenser system according to one form of the invention.

Fig. 2 is a graph showing the magnification for different zones of the mirror systems shown in Figs. 1 and 3.

Fig. 3 is a system according to a preferred form of the invention in which the ellipses are deformed.

Figs. 4 and 5 are transverse sections of the mirrors of Fig. 3 showing noncircular cross-sections for modifying the brightness distribution in the transverse direction.

Fig. 6 is a graph showing certain relationships among the mirror parameters.

Figs. 7 and 8 show elliptical systems corresponding to Fig. 1 but with different parameters.

In Fig. 1 the concave ellipsoidal mirrors 11, 12, have axes of rotational symmetry 13 and 14 respectively. The lamp filament or other light source is located at the first focal point 15 of the first ellipse 11 and is imaged at the second focal point 16, which is also the intersection point of the two axes 13, 14, and is the first focal point of the second mirror 12. The light from the filament image at 16 continues along the same ray paths and strikes the second mirror 12, from which it is reflected toward the second focal point 17 of the second mirror. The film gate 18 is located in the twice-reflected beam and the pupil of the projection lens 19 is located at or near the final focal point 17. The eccentricity of the second mirror 12 is chosen so as to give the preassigned magnification and it is scaled up to a size to locate the final focal point at the preassigned location relative to the pupil of the objective 19, in other words, the distance between the foci 16, 17 depends upon the focal length of the objective. The ray 20A—B—C is the stable ray as above defined and so it is chosen to be the axis of the projection lens 19. Two other rays 21A—B—C, and 22A—B—C are shown which go through the edge of the picture aperture in the gate 18. The size of the first mirror 11 is chosen relative to the diameter of the lamp bulb so that the reflected ray 21B is clear of the lamp bulb.

The system shown in Fig. 1 has the following characteristics:

|  | First mirror | Second mirror |
| --- | --- | --- |
| Semi-major axis, $a$ mm | 63.50 | 108.00 |
| Semi-minor axis, $b$ mm | 55.97 | 60.40 |
| Focal distance from center, $c$ mm | 30.00 | 89.53 |
| Eccentricity. $e=c/a$ mm | 0.472 | 0.829 |
| Angle between optical axis and elliptical axis degrees | 64.2 | 12 |
| Inter-axial angle do | 24 | |

A simple approximate formula for magnification is $M = \sin U/\sin U''$, where $U$ and $U''$ are the angles which the ray through a specified zone makes with the stable ray at the first focus 15 and at the final focus 17 respectively. Another formula which assumes a plane source of zero thickness and allows for the foreshortening due to the aspect angle, is as follows:

$$M = \frac{\sin U \cos U}{\sin U'' \cos U''} = \frac{\sin 2U}{\sin 2U''}$$

These formulae give $M = 4.43$ and $M = 3.38$ respectively at the margin and $M = 5.0$ at the axis. We find the theoretical performance to be the same as that of a single ellipse on axis having the same paraxial magnification, but we avoid having the reflected beam pass through the lamp bulb.

Fig. 2 is a graph showing by full lines 25 and 25' the above-mentioned falling off in magnification according to these two formulae. Actual performance is probably between the two due to the finite thickness of the source.

In Fig. 1 the rays reflected from both mirrors near the optical axis 20A—B—C form an image 23 and those reflected near the marginal rays form smaller image 24 which for diagrammatic purposes only is shown displaced along the axis. If the entrance pupil of the objective 19 is no larger than the marginal image 24, the screen illumination is fairly uniform but the extra size of the paraxial image 23 represents wasted light. On the other hand, if the pupil of the objective is as large as the largest image so as to get the maximum total flux then the smaller size of the other image causes a falling off in illumination.

It is outside the scope of the present description to state exactly what formula should be used to define the magnification or to determine just what light distribution on the screen is most pleasing to the observer, but a smaller amount of decrease from center to edge than is given by the system shown in Fig. 1 is usually desirable, and it is usually preferable to have a large aperture projection lens.

Fig. 3 shows a modification of Fig. 1 in which the ellipses 11 and 12 are replaced by figured or modified ellipsoidal mirrors 31, 32. For the purpose of comparison, the axial ray 20A—B—C is taken to be the same as that in Fig. 1 and the mirrors 31 and 32 are assumed to have the same curvature at the points of reflection of the optical axis. As we proceed along the arc of the curve, however, the first mirror 31 becomes less strongly curved than the elliptical form 11 shown by a dotted line and diverges backward therefrom near the ends of the arc. This results in spherical aberration of the sign corresponding to the marginal rays crossing the axis beyond the focal point 16, usually considered positive or overcorrected aberration. The second mirror 32 follows the elliptical form for a short distance from the optical axis and then diverges from it in the direction of stronger curvature at the ends of the arc than the curvature of the elliptical form likewise shown by a dotted line. This introduces spherical aberration of the sign opposite to that produced by the first mirror. It is pointed out that the purpose of the above-described modification of the spherical aberration of the individual mirrors is not to correct the spherical aberration of the final image but rather to correct the coma thereof so that the axial and marginal filament images corresponding to 23 and 24 of Fig. 1 will be more nearly equal in size. It is known that it is not necessary to correct the spherical aberration of a condenser system completely. Now since the curvatures of the mirrors at the axial points remain unchanged from Fig. 1, the magnification along the axis will be 5.0 as before, but it may be seen by inspection of the figure and is borne out by computations that the angle $U$ which the marginal ray makes with the optical axis before reflection is larger than that shown in Fig. 1 and hence the marginal magnification is increased. This larger angle $U$ is not an unmixed blessing, however, because it makes the filling of the whole film gate 18 more difficult. The mirror 31 must be extended so as to take in the larger cone of light from the lamp 15 and in certain limiting cases the edge thereof will cut in on the twice reflected rays. This occlusion is eliminated by scaling up the first mirror or by being satisfied with a smaller paraxial magnification or a less complete correction of coma.

Fig. 2 shows by a dotted line 26 the falling off in magnification for the form of the invention shown in Fig. 3. This is to be compared with curve 25. In a specific case in which the ellipsoids are deformed to the degree required to give the relationship $U=5U''$ at all aperture zones, the magnification falls off from 5.0 at the center to 4.57 at $U''=8.50$ as computed by the formula $$M = \sin U / \sin U''$$

There is a unique advantage in this specific form of the invention, in which $U=MU''$ at all aperture zones, namely that a different ray can be selected as the optical axis while still maintaining axial symmetry in the plane of the diagram. This is an aid in designing compact systems free from occlusion of the twice reflected beam by the first mirror.

Only the axial plane has been discussed up to this point. The extra-axial rays will now be considered.

First, considering the magnification in the transverse direction produced by rays at and close to the optical axis 20A—B—C, it will be seen that the optical level arms about the point of reflection on each mirror are the same whether one moves the source point back and forth in the axial plane or in the transverse direction. This is true for paraxial rays both in Fig. 1 and Fig. 3, and hence the paraxial magnifications are uniform in all directions.

Next, consider the magnification produced by rays 21A—B—C and 22A—B—C. In Fig. 1, this will likewise be the same in the axial plane as in the transverse direction, neglecting the effect of the aspect angle. In Fig. 3, however assuming each deformed ellipsoid to be a figure of rotation around the axis of the true ellipse, the first optical lever arm along 41B and 42B (considered in the transverse direction) ends at the axis 13 of the true ellipse and not at the optical axis 20B. Likewise the second lever arm along rays 41B and 42B begins at the ellipse axis 14. This shortens the first of these lever arms and lengthens the second as compared with those in the axial plane. Thus the transverse magnification for these rays is not improved as much as the magnification in the axial plane.

Finally, consider a ray in front of ray 20C in Fig. 1 and passing through point 28 at the near margin of the gate. This ray will have been reflected at point 29 of mirror 12 in front of the plane of the diagram and can be followed backward through focal points 16 and then 15. Since point 29 is at a lower latitude with respect to the equator of the second ellipsoid than is point 20', the magnification will be less than that of ray 20A—B—C in the axial plane. The magnification along this ray produced by mirror 11 is more than in the axial plane, but not enough to balance the effect of the more eccentric ellipsoid 12. Thus the net magnification and hence the screen illumination falls off on both sides of the axial plane, and deforming the ellipses in the plane of the diagram has very little effect on this particular aberration.

We have disclosed that this falling off in illumination laterally is made less severe or is fully corrected by making the first mirror less strongly curved and the second mirror more strongly curved around the axis of the original ellipsoid. This is done to a close enough approximation for most cases by making up the mirrors as figures of revolution about axes 33 and 34 which are defined by the focal points 15 and 17 respectively and by the average of the intersection points of rays 41B and 42B with the caustic curve at the intermediate focus.

Figs. 4 and 5 are transverse sections of mirrors 31 and 32 on lines 4—4 and 5—5 respectively of Fig. 3 and show the effect of changing the transverse curvature. The axes 13, 14 of the reference ellipses are viewed end on and appear as points. Ray segments 20A, -B and -C are viewed edge on and appear as lines 20. The circles around the ellipsoidal axes are shown as dotted lines. By decreasing the curvature of mirror 31 and increasing that of mirror 32, ray 50B is made to pass through point 46 above the ellipse axes as shown and to return to or very close to the second ellipse axis 14 at the focal point 17. This lengthens the optical lever arm along ray 50B more than 50A in Fig. 4 and shortens the other optical lever along ray 50B more than 50C in Fig. 5 and so increases the magnification at this transverse margin.

This effect is valid whether the modified curvature is a circular arc with a different radius or a deformed circle, although the relative effect at different zones differs in these two cases. In this way the transverse variation in magnification is controlled independently of the magnification in the axial plane so that by these methods the final screen illumination is made uniform both in the vertical and the horizontal direction or is made to depart from uniformity to a preassigned degree. Local effects are achieved by local polishing of the ellipsoids guided by the above principles.

Fig. 6 is a graph showing certain relationships between the parameters of two-ellipsoid mirror systems according to the invention. The abscissa gives the magnification $m$ of the system along the stable ray and the ordinate gives the eccentricity $e_2$ of the second mirror. A family of three curves in solid lines give the values of $e_2$ vs. $m$ for $e_1=0.25$, 0.50 and 0.75 respectively as labelled, all for an inter-axial angle of 30°. A similar family of curves in long dashes gives the corresponding data for an inter-axial angle of 60°, and a third family in short dashes gives the corresponding data for an inter-axial angle of 90°. In designing a mirror system, two or three approximate sets of values of $e_1$ and $e_2$ are read off the graph, each giving the required magnification, and the one which is nearest to giving the desired field coverage is chosen for final touching up.

The position of the stable ray is not given on this graph, but we have found that if the axis of the more eccentric ellipse is continued across the other ellipse its intersection with the far side thereof approximately locates a point on the stable ray extended backward.

Fig. 7 shows in diagrammatic axial section a two-ellipse system made up for a home motion picture projector. The mirrors 71, 72 with focal points 75, 76, 77 and the film gate 78 and lens 79 shown in outline correspond with Fig. 1 but have the following parameters:

|  | First mirror | Second mirror |
|---|---|---|
| Major semi-axis inches | 1.692 | 1.000 |
| Minor semi-axis do | 1.535 | 0.784 |
| Focal distance from center do | 0.712 | 0.621 |
| Eccentricity | 0.421 | 0.621 |
| Angle between optical axis and elliptical axis degrees | 83.8 | 30.2 |
| Inter-axial angle do | 33 | |

The projection lens covers a field of ±4.6°, and the filament image is magnified about 2.9 times by the rays through the margin of the film gate. The lamp filament is offset slightly (about 0.075") to point 75' to equalize the slight optical unsymmetry of the mirror system previously mentioned. A shutter disk 70 cuts through the intermediate focal point 76 and cuts the light off very sharply for the film advance. Optionally the lamp is backed up by a conventional spherical mirror 69 with its center at point 75'. Optionally, these ellipsoidal mirrors may be deformed in the same general way as shown in Fig. 3, but they have been found to work very satisfactorily without deformation at this low magnification.

Fig. 8 shows in diagrammatic axial section an example of a design in a higher range of magnification. This system has the following parameters:

|  | First mirror 81 | Second mirror 82 |
| --- | --- | --- |
| Eccentricity | 0.401 | 0.900 |
| Angle between optical and elliptical axes...degrees | 54 | 5.5 |
| Inter-axial angle......................................do | 80 | |
| Axial magnification | 20 | |
| Marginal magnification | 1 12 | |

[1] Approximately.

By foregoing the behind-the-lamp reflector and permitting the once-reflected light to pass back through the source 85, this system accepts a cone of ±80°, almost a hemisphere, and approaches the theoretical limit of magnification.

As a specific example of the deformed ellipsoidal system shown in Fig. 3, a series of points on each mirror curve have been computed and the $x$ and $y$ coordinates are given in the table below, the source point 35 being taken as the origin and the final image point 37 being at 238.18 mm. on the $x$-axis.

| First mirror 31 | | Second mirror 32 | |
| --- | --- | --- | --- |
| $x$ (mm.) | $y$ (mm.) | $x'$ (mm.) | $y'$ (mm.) |
| −12.573 | −36.802 | 119.790 | 68.732 |
| −9.118 | −39.081 | 114.866 | 68.331 |
| −5.353 | −41.201 | 109.892 | 67.770 |
| −1.260 | −43.135 | 104.887 | 67.039 |
| +3.180 | −44.849 | 99.869 | 66.131 |
| +7.986 | −46.299 | 94.861 | 65.036 |
| +13.169 | −47.437 | 89.887 | 63.749 |
| +18.740 | −48.201 | 84.974 | 62.261 |
| +24.696 | −48.522 | 80.149 | 60.568 |
| +31.026 | −48.320 | 75.443 | 58.667 |
| +37.697 | −47.504 | 70.891 | 56.554 |
| +44.645 | −45.968 | 66.542 | 54.224 |
| +51.639 | −43.495 | 62.468 | 51.670 |
| +58.707 | −40.164 | 58.620 | 48.922 |
| +65.745 | −35.917 | 55.013 | 45.991 |
| +72.424 | −39.620 | 51.784 | 42.858 |
| +78.634 | −24.324 | 48.896 | 39.554 |
| +84.100 | −17.048 | 46.404 | 36.087 |
| +88.562 | −8.886 | 44.344 | 32.476 |
| +91.765 | 0.000 | 42.750 | 28.737 |
| +93.490 | +9.380 | 41.655 | 24.894 |
| +93.578 | +18.969 | 41.088 | 20.970 |
| +91.956 | +28.445 | 41.073 | 16.993 |

This carries the curve beyond the useful area at each end.

In computing this table, equal successive incremental angles of 0.1 radian and 0.02 radian were used in the respective fans of rays. The ratio of these gives the magnification equal to five. One ray was selected as the optical axis and the two points of reflection were selected at $x=44.645$ and $x=66.542$. The inclination of the once-reflected ray and the angles of incidence I and I' on the respective mirrors were computed by standard exact formulae. The polar radius $P_1$ along the neighboring ray was then computed by an approximate formula and the points thus computed were assumed to be the points of reflection along this new ray, which was then taken as a basis for computing the next ray at the next successive incremental angle.

While satisfactorily exact results can be obtained by using the approximate formula $$P_{n+1}=P_n(1-\tan I_n \Delta U)$$

for computing the $(n+1)^{\text{th}}$ polar radius from the $n^{\text{th}}$ if small enough incremental angles are used, we prefer to extrapolate I roughly to the middle of the incremental interval. In computing the above table we used the formula $$P_{n+1}=P_n[1-\tan (1.5I_n-0.5I_{n-1})\Delta U]$$

For this, an estimated initial value of $I_{n+1}$ was supplied in the opening routine. By way of comparison, the first formula in this paragraph gives coordinates of 93.42, 28.90 and 39.31, 17.14 for the last point in the table.

As already mentioned, one of the advantages of choosing a uniformly spaced fan of rays is that after the computation any ray can be selected as the optical axis. However, if other predetermined conditions of brightness distribution are to be met the two fans of rays must be non-linearly related. For example, the rays in the two fans may conveniently be spaced at uniform steps of increment of the sines of the angles U and U'' rather than the angles themselves or a suitable constant A be selected and U computed equal to $M[U''+A(U'')^3]$.

Moreover, the fan of rays converging to the final image may optionally be set up with a predetermined amount of spherical aberration when desired, although it is usually more convenient to compute the mirrors for zero spherical aberration.

These examples are illustrative only, and the invention is of the scope of the appended claims.

We claim:

1. An illuminating system comprising a light source and two generally ellipsoidal off-axis concave mirrors which face each other obliquely, in which the light source is located substantially at one ellipsoidal focus of the first mirror whereby a first image thereof is formed at the second ellipsoidal focus, in which one ellipsoidal focus of the second mirror is located at said first image whereby a relayed image is formed at the other ellipsoidal focus of the second mirror, in which the angle between the axes of the respective ellipsoids is between 10° and 80°, in which the mirrors are located at least for the most part in the obtuse angles formed by the axes, in which the light source and first mirror are both on the same side of the axis of the second mirror, and in which the relayed image is located on the axis of the second mirror in the direction more remote from the source whereby the magnifications at the two sides of the optical beam tend to be equalized, the overall magnification being at least two.

2. An illuminating system according to claim 1 in which the optical axis is located at the stable ray of the two-ellipsoid system.

3. An illuminating system according to claim 1 in which the eccentricity of the second ellipsoid is greater than that of the first.

4. An illuminating system comprising a light source and two concave mirrors facing each other obliquely, in which each mirror is an off-axis portion of a generally spheroidal surface having an axis of rotational symmetry, in which the two axes intersect at an acute angle between 10° and 80°, in which the two mirrors are located at least for the most part in the obtuse angles supplementary thereto, in which the light source is located on the axis of the first mirror on the same side of the axis of the second mirror as is the first mirror and optically conjugate to the intersection point of the two axes with respect to the first mirror whereby the first mirror forms an image of the light source at the intersection point, in which said intersection point is optically conjugate to a point on the axis of the second mirror in the direction more remote from the light source whereby the second mirror forms a relayed image of the light source at said conjugate point, and in which the second mirror is so tilted that it intercepts those rays which are reflected from the first mirror at the margin most remote from the light source closer to the axial intersection point than it intercepts those rays which are reflected from the first mirror at the margin closest at the light source, whereby the magnifications produced by said two groups of rays are equalized, the final magnification being greater than two and the average magnification of the second mirror being greater than that of the first.

5. An illuminating system comprising a light source and two concave ellipsoidal mirrors facing each other obliquely and each having an axis of rotational symmetry and an eccentricity between 0 and 1, in which the two axes of rotational symmetry intersect at an acute angle between 10° and 80°, in which the two mirrors are off-axis portions of the ellipsoids located at least for the most part in the obtuse angle supplementary thereto, in which the light source is located at a point on the axis of the first mirror on the same side of the axis of the second mirror as is the first mirror and conjugate to the intersection point of the two axes whereby the first mirror forms an image of the light source at the intersection point, in which the second mirror is positioned so that the intersection point of the two axes is conjugate to an image point on the second said axis in the direction more remote from the light source, and in which the second mirror has a greater eccentricity than the first and is so tilted that it intercepts those rays which are reflected from the first mirror at the margin most remote from the light source closer to the axial intersection point than it intercepts those rays which are reflected from the first mirror at the margin closest to the light source, whereby the magnifications produced by said two groups of rays are equalized, the final magnification being greater than two and the average magnification of the second mirror being greater than that of the first.

6. An illuminating system according to claim 5 in which both of the mirrors are prolate ellipsoids and in which the light source and its first image are at the two foci of the generating ellipse of the first mirror and in which the first image and the second image of the light source are at the two foci of the generating ellipse of the second mirror.

References Cited in the file of this patent

UNITED STATES PATENTS

| | | |
|---|---|---|
| Re. 17,037 | Ballman et al. | July 17, 1928 |
| 1,763,630 | Hopkins | June 10, 1930 |
| 2,342,115 | Blauvelt | Feb. 22, 1944 |
| 2,624,234 | Gretner | Jan. 6, 1953 |
| 2,737,846 | Bean | Mar. 13, 1956 |

U. S. DEPARTMENT OF COMMERCE
PATENT OFFICE

CERTIFICATE OF CORRECTION

Patent No. 2,819,649            January 14, 1958

John H. McLeod et al.

It is hereby certified that error appears in the printed specification of the above numbered patent requiring correction and that the said Letters Patent should read as corrected below.

Column 3, line 43, for "ecentricity" read --eccentricity--; column 4, line 68, for "reffection" read --reflection--; column 5, line 9, for "8.50" read --8.5°--; line 60, for "disclosed" read --discovered--; column 7, second table, first column, eighth item thereof, for "+18,740" read --+18.740--; same column, thirteenth item thereof, for "+51,639" read --+51.639--; same column 7, line 74, for "$I_{n+1}$" read --$I_{n-1}$--; column 8, line 69, for "at the" read --to the--.

Signed and sealed this 15th day of April 1958.

(SEAL)
Attest:

KARL H. AXLINE

Attesting Officer

ROBERT C. WATSON
Commissioner of Patents